United States Patent [19]
Fortier

[11] Patent Number: 5,530,851
[45] Date of Patent: Jun. 25, 1996

[54] EARLY COMMIT TIMESTAMP COMPUTER DATABASE PROTOCOL

[75] Inventor: Paul J. Fortier, Portsmouth, R.I.

[73] Assignee: The United States of America as represented by the Secretary of the Navy, Washington, D.C.

[21] Appl. No.: 238,033

[22] Filed: Apr. 28, 1994

[51] Int. Cl.$^6$ .................................................. G06F 17/30
[52] U.S. Cl. .................................. 395/600; 364/DIG. 1; 364/282.1; 364/282.2
[58] Field of Search ....................................... 395/600, 650

[56] References Cited

U.S. PATENT DOCUMENTS

| | | | |
|---|---|---|---|
| 4,881,166 | 11/1989 | Thompson et al. | 395/600 |
| 5,241,675 | 8/1993 | Sheth et al. | 395/600 |
| 5,263,156 | 11/1993 | Bowen et al. | 395/600 |

OTHER PUBLICATIONS

Fortier, Paul J., "Early Comit," University of Massachusetts, Lowell, MA, Apr. 28, 1993, pp. 1–29, 35–41.
Korth & Silberschatz, Database System Concepts 2/e McGraw–Hill, pp. 374–377, 494–507, 1991.
Agrawal, D. et al., "Concurrency Control Performance Modeling: Alternatives and Applications" ACM Trans. Database Systems, vol. 12, No. 4, Dec. 1987.
Haerder, T. "Principles of Transaction–Oriented Database Recovery" ACM Computing Surveys, vol. 15, No. 4, Dec. 1983.
Dias, D. M., et al., "Certification with Adaptive Time Stamp Selection" IBM Technical Disclosure Bulletin, vol. 32, No. 8A, Jan. 1990.
Thomas, R. "A Solution to the Concurrency Control Problem for Multiple Copy Databases" Proc. IEEE Compcon, 1979.

*Primary Examiner*—Thomas G. Black
*Assistant Examiner*—Peter Y. Wang
*Attorney, Agent, or Firm*—Michael J. McGowan; James M. Kasischke; Prithvi C. Lall

[57] ABSTRACT

A computer database method wherein the data is organized into atomic data sets and transactions are separated into projections which operate on only one atomic data set. Multiple transactions can thereby access the same atomic data set using a plurality of projections. A projection timestamp is generated by the system initial access to the atomic data set by the projection. Read and write timestamps are maintained separately by the atomic data set. Upon each read and write command, the issuing projection timestamp is compared against the appropriate atomic data set read or write timestamp. The operation succeeds if the compared timestamps do not indicate a conflict. Upon failure the projection is restarted with a new timestamp.

3 Claims, 4 Drawing Sheets

| Step | Transactions | | Timestamps | |
|---|---|---|---|---|
| | $T_1$ | $T_2$ | ADS A | ADS B |
| 1 | r (a) | r (b) | $TS(\pi_A(1)) = X$ | $TS(\pi_B(2)) = Y$ |
| 2 | r (b) | r (a) | $TS(\pi_A(2)) = X + 1$ | $TS(\pi_B(1)) = Y + 1$ |

Let a ∈ A and b ∈ B and TS(A) = X and TS(B) = Y initially

FIG. 4

| Time | Transactions | | Timestamps |
|---|---|---|---|
| | $T_1$ | $T_2$ | |
| $t_1$ | $r_1$ (a) | | $TS(\pi_A(1)) = X$ |
| $t_2$ | | $r_2$ (a) | $TS(\pi_A(2)) = X + 1$ |
| $t_3$ | | $W_2$ (a) | $TS(\pi_A(2)) = X + 1$ |
| $t_4$ | $w_1$ (a) | | $TS(\pi_A(1)) = X$ |

FIG. 5

EARLY COMMIT TIMESTAMP COMPUTER DATABASE PROTOCOL

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED PATENT APPLICATIONS

This patent application is co-pending with four related patent applications entitled Early Commit Locking Computer Database Protocol, Ser. No. 08/238,045, now pending; Early Commit Optimistic Computer Database Protocol, Ser. No. 08/238,036, now pending; Replay Recovery Protocol for Real-Time Database Management Systems, Ser. No. 08/238,034, now pending; and Merge, Commit Recovery Protocol for Real-Time Database Management Systems, Ser. No. 08/236,900, now pending all by the same inventor and filed on the same date as subject patent application.

BACKGROUND OF THE INVENTION

1. Field of the Invention

The present invention relates to a computer database method for providing an early database commit while increasing database concurrency and limiting cascading aborts to minimize the impact on recovery for a decomposed database and transaction system.

2. Description of the Prior Art

Real-time command, control and communications ($C^3$) systems control physical systems by extracting data from sensors, processing the extracted data, and performing control actions based on this processed data. Real-time $C^3$ systems are applied to applications where timeliness of data access, data processing and reactive responses are critical to the applications successful operations.

Real-time $C^3$ systems are being applied to a wide variety of physical systems, such as automotive control, aircraft control, spacecraft control, power management, automated factories, medical assistance and defense oriented systems. The main function of real-time $C^3$ systems is to manage and utilize information to control the real world environment. Therefore, these systems can be viewed as large information management systems that must respond in predictable ways and within specified time frames.

Real-time $C^3$ systems differ from conventional, general purpose systems in the sense that consistency and correctness of the real-time systems operation is dependent on the timeliness and predictability of responses to the controlled processes activities. In a real-time $C^3$ system, information is repeatedly collected from the physical system. Collected information is sampled, converted, formatted, timestamped and inserted into the control computer's database for each sampling period of the systems sensors. Stored data must be provided to the control software and system operators to be acted on to produce some desired control action.

Once the data is inserted into the database, it is used to compute a variety of related parameters. For example, raw sensor inputs from a radar system can be read and reduced to a bearing, range, and speed. These data items in turn can be used to compute detailed tracks of contacts, allowing for long-term tracking of an object. In addition, the raw information can be used to compute a profile on an object being tracked. This makes possible the classification and identification of an observed object. Transactions written to accomplish these computations require predictable and correct access, but not necessarily serializable access.

Real-time computing systems are being applied to a greater variety of control applications that require timely information.

Researchers are looking towards real-time computer systems as an emerging and important discipline in computer science and engineering. The real-time systems are characterized as possessing time dependent operations, reliable hardware and software, synergy with the controlled environment, predictable service. Predictability should be maintained not only in task scheduling, but also in scheduling all assets such as input/output, processing, communications, storage, and specialized controllers.

Databases within real-time systems must satisfy not only database consistency constraints but also timing constraints associated with transactions.

Responsive real-time databases must be predictable yet timely in their service. Real-time databases must incorporate features from real-time operating systems schedulers. A means to select the most appropriate database action to perform is necessary, and the scheduler must be adaptive to an ever changing real-time systems state. For correct database operations, real-time schedulers must be integrated with high performance concurrency control algorithms.

Recovery techniques based on rollback are not adequate in a real-time environment nor are present concurrency control techniques based on locking due to added blocking delays. Transactions must use non-serializable techniques, embedded transaction semantic knowledge, decomposition of transactions and the database to form more concurrent executions.

Transactions represent the unit of work recognized by users as being atomic. "Atomic" meaning that the operation or operations must complete execution or be aborted all together. Transactions serve the dual purpose as the unit for concurrency and recovery in database systems. Concurrency provides for indivisible access to data objects by concurrently executing users; and recovery provides for data restoration due to hardware, software, and transaction failures.

Due to these properties researchers look towards the use of transactions as a tool for structuring computations in distributed systems.

Research into transaction decomposition is relatively new; however, researches have studied breaking transactions into nested elementary transactions to increase concurrency. One approach to this is to decompose transactions into disjointed operations separated by breakpoints which breakpoints define allowable interleaving to allow increased concurrency. Another approach is to decompose transactions into data flow graphs of transaction computations steps which can be optimized to increase performance.

The data itself can also be decomposed into atomic data sets (ADS) to allow a more concurrent execution of decomposed transaction steps. Many researchers indicate that a finer granularity on data objects can increase data concurrency if managed properly. Availability and timeliness of data and processing has been pointed out as being a desirable feature in real-time database management systems and may be more important that consistency. Thus, the cited research indicates using transaction decomposition, database decomposition, and parallel and concurrent execution of database actions to provide for increased performance.

Concurrency control is used to ensure database consistency while allowing a set of transactions to execute concurrently. The problem solved by concurrency control is to allow non-interfering readers and writers free access, while controlling and coordinating the actions of conflicting readers and writers. There are three basic concurrency control approaches for transaction processing in database systems: locking, timestamp ordering and optimistic. The basic concurrency control techniques rely on syntactic information to make concurrency control decisions. The correctness of the algorithms is based on serializability theory.

These concurrency control techniques are inherently pessimistic. They avoid conflicts by enforcing serialization of conflicting database actions. Prior art literature points out that serializability as a correctness criteria is to stiff a requirement for real-time systems. Real-time concurrency control algorithms, must integrate real-time scheduling algorithms with concurrency control techniques.

Semantic information about transactions can be used to develop non-serializable scheduling of transaction steps that nonetheless are correct executions. A prior art method using this breaks transactions into a collection of disjoint classes. Transactions that belong to the same class are compatible allowing for arbitrary interleaving, whereas transactions that belong to different classes are incompatible and cannot interleave. Another prior art method defines a scheme wherein the transaction writing system decomposes transactions into steps upon which concurrency control can be performed. Transactions are broken at breakpoints, and type classes defined on the breakpoints. Transactions of compatible classes can interleave at this point, others cannot. A further refinement of this technique is achieved by using a larger volume of transaction class types which results in a finer granularity of breakpoints. This system increases concurrency by adopting a looser definition of correctness than serializability.

Other prior art research suggests the use of decomposition of both transactions and the database into finer granules to increase concurrency. In this theory the database and transactions are decomposed into atomic data sets (ADS) and elementary transactions respectively. Elementary transactions are executed concurrently on distributed assets of an ADS. This theory suggests that if elementary transactions are serialized with respect to an ADS then correct and consistent database executions result.

The aforementioned schemes do not address the issues in management of real-time data which are driven by the needs of the overall system, based on criticality of operations, nature of deadlines, and timing requirements. This paper develops and presents transaction concurrency control algorithms for real-time systems, based on decomposition of both the database and individual transactions, along with the application of criticalness, deadlines, and timing requirements to improve real-time database systems performance and predictability.

SUMMARY OF THE INVENTION

Accordingly, it is a general purpose and object of the present invention to provide a method for operation of a real-time database system.

It is a further object that such real-time database system provide a high degree of concurrency.

Another object is that such provide predictable results during transaction execution.

These objects are accomplished with the present invention by providing a computer database method wherein the data is organized into atomic data sets and transactions are separated into projections which operate on only one atomic data set. Multiple transactions can thereby access the same atomic data set using a plurality of projections. A projection timestamp is generated by the system initial access to the atomic data set by the projection. Read and write timestamps are maintained separately by the atomic data set. Upon each read and write command, the issuing projection timestamp is compared against the appropriate atomic data set read or write timestamp. The operation succeeds if the compared timestamps do not indicate a conflict. Upon failure the projection is restarted with a new timestamp.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 shows a flow chart of the early-commit locking protocol of the current invention;

FIG. 2 shows a flow chart of the early-commit timestamp protocol of the current invention;

FIG. 4 shows a series of sample transactions illustrating operations of the current invention; and FIG. 5 shows another series of sample transactions illustrating operations of the current invention.

DESCRIPTION OF THE PREFERRED EMBODIMENT

Figure 3:
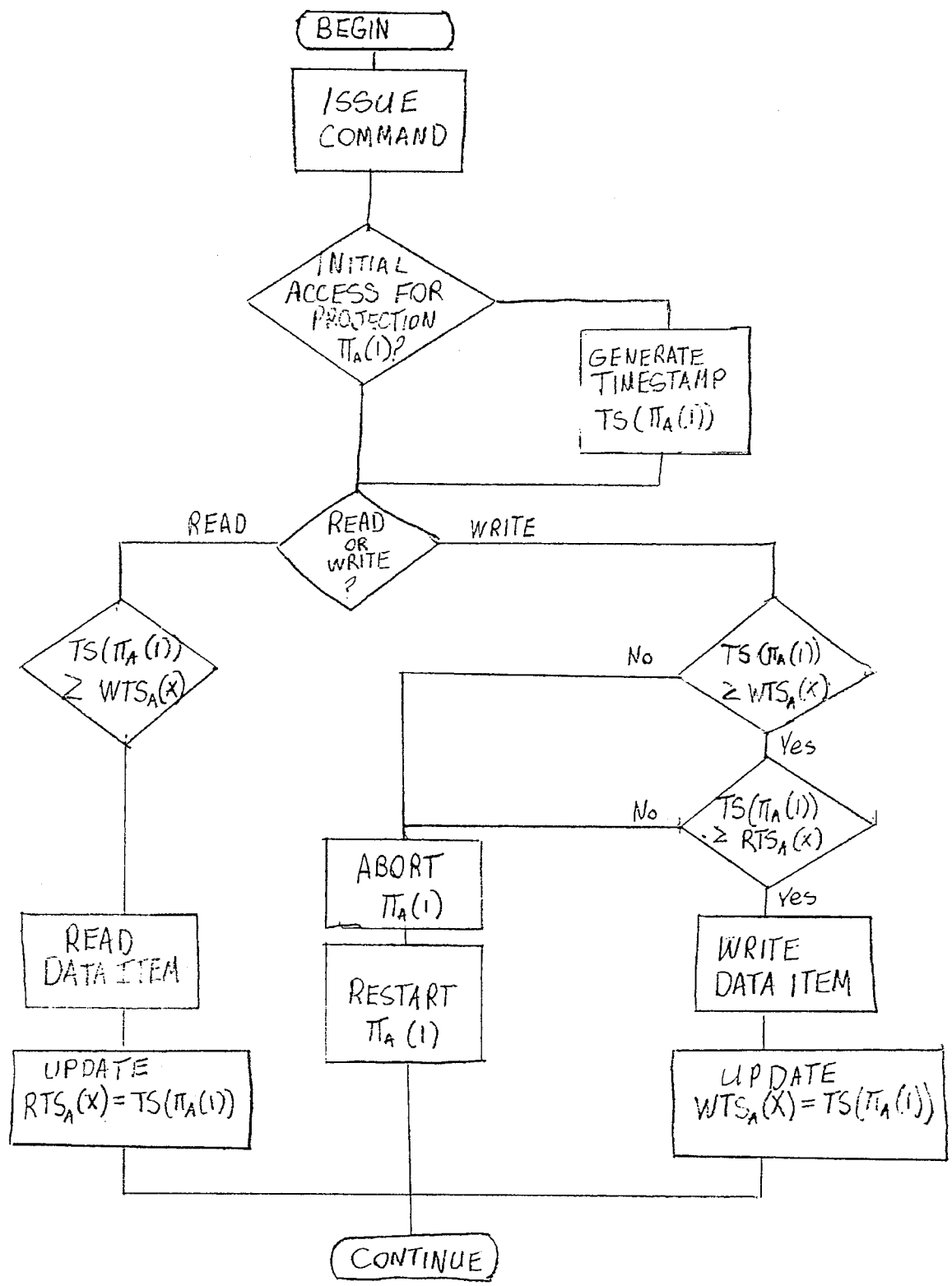
FIG. 3 shows a flow chart of the early-commit optimistic protocol of the current invention.

Database systems manage formatted collections of shared data. The database consists of collections of data fields, which are the finest granularity of data units available for users to manipulate. A data field is a basic data type such as name, age, address, etc. These basic data fields are organized into data items. Data items are the units for managing concurrency. Data items are not nested inside each other. Data items can be in the form of conventional records or objects. In this application the terms "item" and "record" are used interchangeably.

Relationships in the form of mathematical predicates are defined over items of the database. These predicates restrict the altering of database data items and structures. Database consistency means that all constraints are true. Constraints have the general form of predicates on database items. Constraints between data items of the database describe how database structures and items can be manipulated.

Constraints on database items are used to decompose the database into atomic data sets (ADSs). The database is a set of data items. Let $i_1$, $i_2$ be two distinct items from the set of database items. Let constraint, $C(i_1, i_2)$, hold if there is a constraint that refers to $i_1$ and $i_2$. Let C' denote the transitive and reflexive closure of C. The closure of constraints forms equivalence relations. The equivalence relations induced by C' are called atomic data sets (ADSs). Consistency is maintained on each ADS in isolation from other ADSs.

Transactions define logical units of work on the database. Transactions have a lower bound (begin transaction, BT) and an upper bound (end transaction, ET) defining boundaries for transaction management. Between boundaries, transactions enclose operations on the database of the form:

read a data item x, r(x) or write a data item x, w(x), and transaction code.

For example, consider the transaction of FIG. 1. Let $v_1$, $v_2$, $v_3$, and $v_4$ be variables of transaction T. Let a,b,c, and d be data items from an ADS. Execution of statement $S_6$: w(d, $V_4$) causes the variable $V_4$ to be written to the data item d. Statement $S_1$: $v_1$:=r(a) represents a read from data item a into variable $v_1$. The reading of a data item into a variable defines the variables value. Statement $S_5$ is an assignment statement. Assignment statements use variables to define new or existing variables. Statements of this type are of the form $v_0$:=f(vlist) where vlist represents a set of variables used in computing $v_0$ and f is a function performed over vlist. $S_5$ applies function $f_1$ using variables $v_1$, $v_2$, and $v_3$ to define variable $v_4$.

The conventional transaction model is extended to include boundaries on atomic data set accesses. These boundaries are formed on the initiation of access and termination of access to an atomic data set. The first request is preceded by a subbegin marker (sb) indicating the lower bound of access by this transaction on a named ADS. Terminate can be either a subabort (sa) or subcommit (sc) operation indicating the upper bound of access by this transaction on a named ADS.

A transaction accessing an ADS A, acquires resources in A as needed and releases resources once the last access to ADS A is performed. Transaction writers define when the first access to ADS A occurs and when the last access is performed. Boundaries for projections are formed using subbegin and subterminate statements.

After the last access to ADS A, a transaction cannot acquire more data items from ADS A. In this fashion the access and manipulation of ADS A, between the initial request for access until the final access forms a projection upon which concurrency control can be enforced. A projection $\pi_A(i)$ contains all accesses to ADS A from transaction $T_i$ and none from any other transaction.

An example of projections from a transaction is shown in FIG. 2. In this example A and B are individual ADSs. Let a, b, and c be items from these ADS A, and d be an item from ADS B. Access to items in ADS A are bound in between sb (A) and sc (A), or sa(A), and, likewise, accesses to ADS B are bound between sb(B) and sc(B), or sa(B). A statement that reads a data item defines the variable the data item is read into. A read statement is in the projection controlling access to the data item read.

In the example of FIG. 2, statements $S_1$, $S_2$, $S_3$ define local variables $v_1$, $v_2$, and $v_3$ by reading ADS A data items a, b, and c into these variables. Statements $S_1$, $S_2$, and $S_3$ are in projection $\pi_A$ since variables $v_1$, $v_2$, and $v_3$ are defined by reading data items from ADS A. Statement $S_5$ defines variable $v_4$ by reading data item d from ADS B into $v_4$. Statement $S_5$ is in $\pi_B$ by reading a data item from ADS B.

A statement that writes a data item defines the data item. A write statement is in the projection controlling access to the data item written. In the example of FIG. 1 statement $S_6$ defines data item d of ADS B when it performs the write operation w(d, $v_4$); therefore, statement $S_6$ is in projection $\pi_B$.

A statement, S directly depends on a statement S' if S follows S' and S uses at least one variable defined by S'. In the example of FIG. 1, assignment statement $S_5$ defines variable $v_4$ by performing a function f on variables in projection $\pi_A$. Since statement $S_5$ uses variables from statements $S_1$, $S_2$ and $S_3$, $S_5$ directly depends on $S_1$, $S_2$ and $S_3$.

A statement S depends on a statement S' if S directly depends on S', or there is a statement S* such that S directly depends on S* and S* depends on S'. In the example of FIG. 1, write statement $S_6$ writes data item d using variable $v_4$. Variable $v_4$ was defined in $S_5$, therefore $S_6$ depends on $S_5$. In addition since $S_5$ directly depends on $S_1$, $S_2$ and $S_3$, $S_8$ depends on $S_1$, $S_2$ and $S_3$.

A projection accesses data items outside of its boundaries by using statements in siblings. A projection $\pi$ that uses statements that are in or depend on a sibling $\pi'$, depend on $\pi'$. In FIG. 1, statements $S_5$ and $S_6$ are in projection $\pi_B$, and statements $S_1$, $S_2$ and $S_3$ are in $\pi_A$. Statement $S_6$ uses variable $v_4$ defined by statement $S_5$ which depends on statements $S_1$, $S_2$ and $S_3$. Since $S_6$ depends on $S_5$ and $S_5$ depends on statements in $\pi_A$, then $\pi_B$ depends on $\pi_A$.

A projection $\pi$ that depends on a sibling $\pi'$ cannot commit until $\pi$ commits. In FIG. 2 projection $\pi_B$ cannot commit until projection $\pi_A$, is ready to commit. The delaying of commit will maintain the correctness of executions in the face of failures.

Projections act independently on ADS's. A projection acts on a single ADS reading data items into variables, using variables to perform computations and to define variables and data items. If no interaction with sibling projections occur the projection can commit. If a projection uses a sibling's variables, it depends on the sibling projection. Dependent projections must wait for siblings to commit to do likewise. A projection that depends on no siblings need not delay. In FIG. 2, projection $\pi_A$ can commit when ready since it does not depend on $\pi_B$ or any other sibling. Projection $\pi_B$ must delay commit until $\pi_A$ commits, since $\pi_B$ depends on $\pi_A$. Correct and consistent execution results if projections of a transaction coordinate in this fashion.

Projections from distinct transactions cannot use variables defined within other transactions. For correct and consistent execution, projections from distinct transactions must be committed serializably with each other on individual atomic data sets.

A projection $\pi_A(i)$ from a transaction $T_i$ and a projection $\pi_A(j)$ from another transaction $T_j$ that act on the same ADS A must execute such that, the effects of the concurrently executing projections on the database either precede or follow each other. In the above example, projection $\pi_A(i)$ of $T_i$ either precedes execution of projection $\pi_A(j)$ of $T_j$ or $\pi_A(i)$ follows the execution of projection $\pi_A(j)$. The correct execution of conflicting projections is determined by formation of projection schedules for each atomic data set and checking if the schedules are serializable.

Conventional timestamp concurrency control determines serialization order at transaction start-up. The order is established by assigning a timestamp to transactions as they begin, then checking these timestamps against others to determine if the order will be violated by an executing transaction's operation.

In conventional timestamp ordering, transactions operate by acquiring a timestamp at initiation, executing read and write accesses based on the timestamp ordering rule. The timestamp ordering (TSO) rule states that if $OP_i[X]$ and $OP_j[X]$ are conflicting operations from two distinct transactions $T_i$ and $T_j$ then the data manager processes $OP_i[X]$ before $OP_j[X]$ if and only if the timestamp of $T_i$ is less than the timestamp of $T_j$. All operations of transactions $T_i$ and $T_j$ follow this rule, thereby enforcing a serializable order of execution.

In the early commit timestamp ordering protocol of this invention, each transaction acquires multiple timestamps, one timestamp for each ADS accessed by the transaction. Each of these timestamps is then used to serialize access of conflicting transactions' operations on distinct ADSs.

Like the conventional model, timestamps are used to order accesses. Accesses are handled the same as in conventional systems with requests for reads or writes to the data manager issued and either granted, if the timestamp of the requesting projection is greater than the timestamp of the data item, or rejected otherwise.

In FIG. 3 there is shown a flow chart of the early commit timestamp protocol of the current invention. When an initial access to an ADS is performed, a timestamp is allocated to the transaction's projection. On further accesses to the same ADS, this timestamp is used to order conflicting accesses for this projection only. Sibling projections use distinct timestamps to order accesses on distinct ADSs.

Timestamps must be unique and increase monotonically. Timestamps can be assigned in a variety of ways such as by using the system's real-time clock, by using a monotonically increasing counter or unique priority based indicator or the like. Our protocol enforces concurrency control on an ADS basis, limiting the efficiency of a single counter. To construct a timestamp, we use the ADS local counter along with the ADS identifier.

As transaction T's projections make initial access to some ADS A, they are given a timestamp for A by the rule:

$$TS(\pi_A(T))=A\text{-ID o A-local-counter.}$$

The scheduler orders conflicting accesses from projections using the rule that the earliest projection's operations are scheduled before later projection's operations if the time stamp of the earlier projection's operation is less than that of the later projection's operation.

For example let $\pi_A(i)$ and $\pi_A(k)$ be two conflicting projections operating on ADS A, belonging to transaction $T_i$ and $T_k$ respectively. $\pi_A(i)$'s conflicting accesses are scheduled before $\pi_A(k)$, if and only if $TS(\pi_A(i))<TS(\pi_A(k))$. $\pi_A(i)$ is the younger projection and $\pi_A(k)$ the older.

The scheduler is required to compare timestamps on access to guarantee that conflicts do not occur. The scheduler maintains two timestamps for each data item, a read timestamp RTS(X), which is the timestamp of the youngest projection that has read data item X, and a write timestamp WTS(X), which is the timestamp of the youngest projection that has written data item X. Two tests are performed to guarantee correct ordering of reads and writes on ADSs.

On read of a data item X in ADS A:

$$TS(\pi_A(i)) \geq WTS(X)$$

The timestamp of the requester projection $\pi_A(i)$ must be greater than or equal to the write timestamp stored at the data item. This guarantees that the requester's read has come after any older projection's write.

On a write of a data item X in ADS A:

$$TS(\pi_A(i)) \geq RTS(X) \text{ and } TS(\pi_A(i)) \geq WTS(X)$$

On a write request by $\pi_A(i)$, the requester's timestamp is compared to both the data item's read timestamp (RTS(X)) and write timestamp (WTS(X)). If the requester's timestamp is greater than or equal to the ADS's read and write timestamps, then the request is granted and the ADS timestamps adjusted. If not, the request is refused and the requester, projection $\pi_A(i)$, is aborted and restarted.

Until commit of the projection, all changes to the database are recorded in stable store pointed to by the projection's copy index and are not available for other projections to use. On projection commit the changes are entered into the database. If aborted, all data items accessed by the projection $\pi_A(i)$ have their read timestamp (RTS) and write timestamp (WTS) as well as data changes purged from the copy index. The projection is then restarted with a new timestamp.

In FIG. 4, the timestamp protocol would order access to ADS A by $\pi_A(1)<\pi_A(2)$ and ADS B by $\pi_B(2)<\pi_B(1)$. This ordering occurs since the timestamp acquired for $\pi_A(1)$ is less than the timestamp of projection $\pi_A(2)$, and the timestamp acquired for projections acting on ADS B show the timestamp of $\pi_B(2)$ is less than the timestamp for projection $\pi_B(1)$.

If conflict results in failure, the failed projection is aborted and restarted. Other projections of the transaction are not affected. For example, in FIG. 5, two projections operate on the same ADS from distinct transactions and conflict. The read timestamp and write timestamp for ADS A's data item a are initially set to X. Let r(a) and w(a) represent the read and write on ADS A's data item a respectively. Let $TS(\pi_A(1))=X$, represent the timestamp for projection $\pi_A(1)$ of transaction T, on ADS A at time t.

At time $t_1$, projection $\pi_A(1)$ receives a timestamp $TS=X$ from ADS A and uses this to read data item a from ADS A. The test of the ADS read timestamp is successful, and the read timestamp is updated. At time $t_2$, transaction $T_2$ acquires a timestamp from ADS A equal to $X+1$. $T_2$ uses this timestamp to read a data item and update the read timestamp of ADS A. At time $t_3$, transaction $T_2$ issues a write request. Projection $\pi_A(2)$ uses its timestamp=$X+1$ to test if the write is acceptable. The test for a write is correct, since $TS(\pi_A(2)) \geq RTS$ and $TS(\pi_A(2)) \geq WTS$ of ADS A which allows the write to occur at time $t_3$. At time $t_4$, $\pi_A(1)$ tries to write to ADS A, but fails the write timestamp test since its timestamp tests finds that $TS(\pi_A(1))<RTS$ and $TS(\pi_A(2))<WTS$ of ADS A. Accordingly Transaction $T_1$ must abort and restart its projection on ADS A.

Transactions under the early commit timestamp protocol commit projections before transaction completion thereby allowing projection results to be available for other transactions and increasing concurrency. Added concurrency results from shorter periods of conflict time than entire transaction run times as in conventional timestamp ordering. Primitives to access information are the same as conventional accesses but are interpreted by the scheduler differently. Each access is directed to a named ADS and only affects that ADS.

The early commit timestamp protocol requires two additional elements, an ADS counter generator and storage for data item read and write timestamps. Each ADS in the database requires a distinct counter associated with it. This counter is incremented on each projection's subbegin operation. The value computed is then associated with the projection's recovery block table and the projection copy index.

The copy index requires added storage for pointers to manage the read and write timestamps for the data items. Added storage would require additional fields to hold the read and write timestamps. This added storage would be reflected in each projection's copy index. An alternative to save on storage is to associate a pointer to a read set and write set storage area. This alternative would require less overall storage at the cost of an added indirection to access the required information.

A projection uses the computed timestamp, read set, and write set to control concurrent access to data items and ensure projections serializably access ADSs by the timestamp ordering rules mentioned previously. Each ADS maintains a timestamp separate from all other ADSs. In this way, projections operating on a particular ADS are scheduled serializably in isolation from projections acting on other ADSs.

Terminology in this disclosure indicates the use of time as the prioritizing indicia; however, other prioritizing methods can be used as long as the timestamp assigned to a projection assures serial determination. For example, data from a particular source can have greater value than other data and take precedence over the other data when updating the system. Accordingly, the preferred data can be given a timestamp with a higher priority.

The early commit timestamp protocol of the current invention differs from conventional protocols in fundamental ways. The database is composed of a collection of atomic data sets instead of a single monolithic database. Each ADS maintains consistency in isolation from other ADSs. Transaction operations are partitioned over ADSs. Each transaction's collection of operations on an ADS constitutes a projection of these operations over the ADS. Projections from distinct transactions operate on individual ADSs serializably.

Obviously many modifications and variations of the present invention may become apparent in light of the above teachings. In light of the above, it is therefore understood that within the scope of the appended claims, the invention may be practiced otherwise than as specifically described.

What is claimed is:

1. A method for computer database construction and use comprising the steps of:

organizing data items into atomic data sets;

breaking down transactions containing a plurality of statements operating on said data into projections having statements which operate on only one said atomic data set;

issuing commands by said projections, said commands comprising read commands, write commands, and projection delimiting commands;

allowing multiple transactions and projections to access said atomic data set;

generating a timestamp for a projection upon initial issuance of either a read command or a write command to the atomic data set;

maintaining a read timestamp for each data item in said atomic data set which indicates the timestamp of the projection which last issued a read command for the data item;

maintaining a write timestamp for each data item in said atomic data set which indicates the timestamp of the projection which last issued a write command to the data item;

read comparing said issuing projection timestamp with said maintained write timestamp on issuance of a read command, said read comparing step indicating a conflict with an other projection if said issued projection timestamp is earlier in time than said maintained write timestamp;

write comparing said issuing projection timestamp with said maintained write timestamp and said maintained read timestamp on issuance of a write command, said write comparing step indicating a conflict with an other projection if said issued projection timestamp is earlier in time than one of said maintained write timestamp and said maintained read timestamp;

executing said issued command when said read comparing step and write comparing step both indicate that there is no conflict between said issuing projection and said other projection;

updating said maintained read timestamp for said data item in said atomic data set after execution of said issued read command affecting said data item;

updating said maintained write timestamp for said data item in said atomic data set after execution of said issued write command affecting said data item;

aborting said issuing projection when one of said read comparing step and write comparing step indicates that there is a conflict between Said issuing projection and said other projection;

restarting said aborted projection after commit of said other projection, said restarted projection receiving a new timestamp;

committing said projection upon issuance of a projection delimiting command; and recording all changes to said atomic data set in a stable store until commit of said projection.

2. The method of claim 1 wherein said step of committing said projection further comprises:

moving said recorded changes to said atomic data set to a master storage space; and removing all read timestamps and write timestamps maintained by said committing projection.

3. The method of claim 1 wherein said step of organizing data items into atomic data sets comprises the steps of:

establishing constraints regarding the fields and the records required to be in an atomic data set; and generating an atomic data set from said data items in accordance with said established constraints.

* * * * *